United States Patent
Ito

(10) Patent No.: US 11,928,431 B2
(45) Date of Patent: Mar. 12, 2024

(54) METHOD OF PROCESSING LANGUAGE, RECORDING MEDIUM, SYSTEM FOR PROCESSING LANGUAGE, AND LANGUAGE PROCESSING APPARATUS

(71) Applicant: Ricoh Company, Ltd., Tokyo (JP)

(72) Inventor: Hideo Ito, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 573 days.

(21) Appl. No.: 17/262,071

(22) PCT Filed: Sep. 6, 2019

(86) PCT No.: PCT/JP2019/035124
§ 371 (c)(1),
(2) Date: Jan. 21, 2021

(87) PCT Pub. No.: WO2020/066545
PCT Pub. Date: Apr. 2, 2020

(65) Prior Publication Data
US 2021/0165962 A1    Jun. 3, 2021

(30) Foreign Application Priority Data
Sep. 28, 2018   (JP) .................. 2018-186005

(51) Int. Cl.
*G06F 40/20*     (2020.01)
*G06F 40/284*    (2020.01)
(Continued)

(52) U.S. Cl.
CPC ............ *G06F 40/284* (2020.01); *G06F 40/30* (2020.01); *G06F 40/40* (2020.01)

(58) Field of Classification Search
CPC ......... G06F 40/20; G06F 40/30; G06F 40/284
See application file for complete search history.

(56) References Cited

U.S. PATENT DOCUMENTS

2002/0198701 A1* 12/2002 Moore ............... G06F 40/40
704/2
2004/0243403 A1* 12/2004 Matsunaga ......... G06F 40/40
704/209

(Continued)

FOREIGN PATENT DOCUMENTS

JP    2004-287683 A    10/2004
JP    2011-154720 A     8/2011
WO   WO 2016/151986 A1  9/2016

OTHER PUBLICATIONS

International Search Report and Written Opinion dated Dec. 10, 2019 in PCT/JP2019/035124 filed on Sep. 6, 2019.
(Continued)

*Primary Examiner* — Daniel Abebe
(74) *Attorney, Agent, or Firm* — XSENSUS LLP

(57) ABSTRACT

A computer-implemented method of processing language, includes: calculating a value indicating a degree of easiness of association between words with regard to one or more combinations of words in a first word group included in first text data and a second word group included in second text data; associating a first word and a second word based on the value indicating the degree of easiness of association; calculating a value indicating a degree of easiness of association between word groups with regard to a word group in the first text data including the first word and a word group in the second text data including the second word, using a result of the associating and the value indicating the degree of easiness of association between the words; and updating the value indicating the degree of easiness of association between the words by using the value indicating the degree of easiness of association between the word groups.

9 Claims, 13 Drawing Sheets

(51) Int. Cl.
*G06F 40/30* (2020.01)
*G06F 40/40* (2020.01)

(56) References Cited

U.S. PATENT DOCUMENTS

| | | |
|---|---|---|
| 2005/0049867 A1 | 3/2005 | Deane |
| 2008/0183463 A1 | 7/2008 | Deane |
| 2017/0053025 A1* | 2/2017 | De Sousa Webber .. G06F 16/33 |
| 2017/0091314 A1* | 3/2017 | Allen ..................... G06F 40/30 |
| 2017/0249311 A1* | 8/2017 | Pelleg ..................... G06N 5/04 |
| 2018/0113676 A1* | 4/2018 | De Sousa Webber ..................... G06F 40/279 |

OTHER PUBLICATIONS

Le, Q., et al., "Distributed Representations of Sentences and Documents" Proceedings of the 31st International Conference on Machine Learning (ICML'14)—vol. 32•Jun. 2014 •pp. II-1188-II-1196.

Levy, O., et al., "Improving Distributional Similarity with Lessons Learned from Word Embeddings", Transactions of the Association for Computational Linguistics, vol. 3, Dec. 1, 2015 (Dec. 1, 2015), pp. 211-225.

Gale, D., et al., "College Admissions and the Stability of Marriage", American Mathematical Monthly (AMM), vol. 69, No. 1, Jan. 1, 1962 (Jan. 1, 1962), pp. 9-15, 9 total pages.

Benson, T., "A text alignment algorithm inspired by . . . soap operas?", Feb. 12, 2018 (Feb. 12, 2018), 7 total pages.

\* cited by examiner

FIG. 7

|  | YESTERDAY | BOOK | BOUGHT | HE | NOVEL | WRITES |
|---|---|---|---|---|---|---|
| YESTERDAY | 1.0 | 0.0 | 0.0 | 0.3 | 0.0 | 0.0 |
| NOVEL | 0.0 | 0.8 | 0.0 | 0.0 | 1.0 | 0.0 |
| BOUGHT | 0.0 | 0.0 | 1.0 | 0.0 | 0.0 | 0.2 |

FIG. 8

|  | YESTERDAY | BOOK | BOUGHT | HE | NOVEL | WRITES |
|---|---|---|---|---|---|---|
| YESTERDAY | ASSOCI-ATED |  |  |  |  |  |
| NOVEL |  |  |  |  | ASSOCI-ATED |  |
| BOUGHT |  |  | ASSOCI-ATED |  |  |  |

FIG. 9

|  | YESTERDAY | BOOK | BOUGHT | HE | NOVEL | WRITES |
|---|---|---|---|---|---|---|
| YESTERDAY | 1.0 | 0.0 | 0.0 | 1.0 | 0.0 | 0.0 |
| NOVEL | 0.0 | 1.0 | 0.0 | 0.0 | 1.0 | 0.0 |
| BOUGHT | 0.0 | 0.0 | 1.0 | 0.0 | 0.0 | 1.0 |

FIG. 10

|  | ub1 | ub2 |
|---|---|---|
| ua1 | 0.7 | 0.3 |

| | YESTERDAY | BOOK | BOUGHT | HE | NOVEL | WRITES |
|---|---|---|---|---|---|---|
| YESTERDAY | 0.7 | 0.0 | 0.0 | 0.3 | 0.0 | 0.0 |
| NOVEL | 0.0 | 0.7 | 0.0 | 0.0 | 0.3 | 0.0 |
| BOUGHT | 0.0 | 0.0 | 0.7 | 0.0 | 0.0 | 0.3 |

71A

METHOD OF PROCESSING LANGUAGE, RECORDING MEDIUM, SYSTEM FOR PROCESSING LANGUAGE, AND LANGUAGE PROCESSING APPARATUS

TECHNICAL FIELD

The present invention relates to a method of processing language, a recording medium, a system for processing language, and a language processing apparatus.

BACKGROUND ART

According to the background art, in order to determine as to whether two sets of text data have matching content, a person performs a task to determine the associative relation between words included in the two sets of text data so as to make the determination. For example, in a case where the two sets of text data are text data indicating a model answer and text data indicating an examination paper, a teacher determines whether the content of the examination paper matches the content of the model answer after determining the associative relation between words included in the two sets of text data so as to grade the examination paper.

However, the larger the number of words included in each set of text data, the higher the load of this task. Therefore, the background art has developed the automatic association between words by using the Gale-Shapley algorithm.

CITATION LIST

Patent Literature

PTL 1: Japanese Unexamined Patent Application Publication No. 2011-154720

NPTL 1

D. GALE, L. S. SHAPLEY. "College admissions and the stability of marriage", American Mathematical Monthly, 1962, volume 69, pp. 9-15

SUMMARY OF INVENTION

Technical Problem

In the above-described algorithm, however, the degree of easiness of association between words is previously determined, and the words are associated with each other based on the determined degree. For this reason, if the algorithm according to the background art is used to associate words included in the respective two sets of text data, the context, the usage of a word in the context, and the like, are not taken into consideration, and the appropriate association is difficult in some cases.

In one aspect of the present invention, a computer-implemented method of processing language, includes: calculating a value indicating a degree of easiness of association between words with regard to one or more combinations of words in a first word group included in first text data and a second word group included in second text data; associating a first word and a second word based on the value indicating the degree of easiness of association; calculating a value indicating a degree of easiness of association between word groups with regard to a word group in the first text data including the first word and a word group in the second text data including the second word, using a result of the associating and the value indicating the degree of easiness of association between the words; and updating the value indicating the degree of easiness of association between the words by using the value indicating the degree of easiness of association between the word groups.

In one aspect of the present invention, a recording medium storing a computer readable code for controlling a computer system to perform the above-described method is provided.

In one aspect of the present invention, a system for processing language includes: one or more processors; and a memory that stores a plurality of instructions which, when executed by the one or more processors, cause the processors to perform the above-described method.

In one aspect of the present invention, a language processing apparatus includes: a calculating unit configured to calculate a value indicating a degree of easiness of association between words with regard to one or more combinations of words in a first word group included in first text data and a second word group included in second text data; an associating unit configured to associate a first word and a second word based on the value indicating the degree of easiness of association; and an updating unit configured to calculate a value indicating a degree of easiness of association between word groups with regard to a word group in the first text data including the first word and a word group in the second text data including the second word, using a result of the associating and the value indicating the degree of easiness of association between the words, and updating the value indicating the degree of easiness of association between the words by using the value indicating the degree of easiness of association between the word groups.

According to one or more aspects of the present invention, the appropriate association between words is possible.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 7 is a table illustrating an example of word-association-degree information.

FIG. 8 is a table illustrating an example of association information.

FIG. 9 is a table illustrating an example of the update to word-association-degree information.

FIG. 10 is a table illustrating an example of the update to the word-association-degree information.

FIG. 11 is a table illustrating an example of updated word-association-degree information.

DESCRIPTION OF EMBODIMENTS

Figure 1:
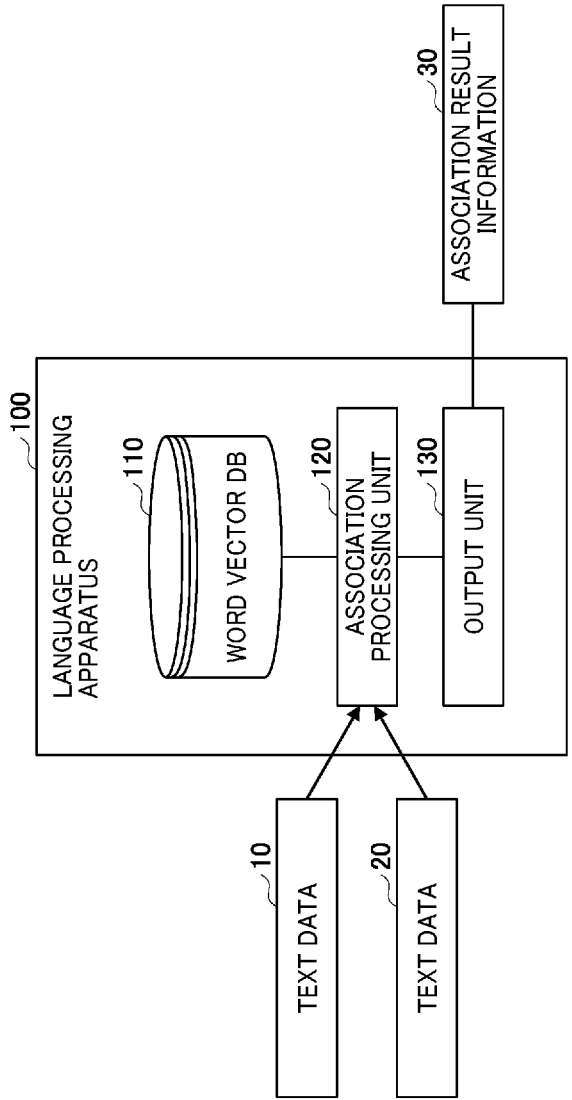
FIG. 1 is a schematic diagram illustrating a functional configuration of a language processing apparatus according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, an embodiment is described below. FIG. 1 is a schematic diagram that illustrates a functional configuration of a language processing apparatus according to an embodiment of the present invention.

A language processing apparatus 100 according to the present embodiment includes a word vector database 110, an association processing unit 120, and an output unit 130.

The word vector database 110 according to the present embodiment may be any database that represents the appearance frequency of each word. The appearance frequency is previously obtained for each word and is stored in the word vector database 110.

The association processing unit 120 refers to the word vector database 110 in response to received inputs of text data 10 and text data 20 and associates a word included in the text data 10 with a word included in the text data 20. The output unit 130 outputs association result information 30.

The association processing unit 120 according to the present embodiment sets the value indicating the degree of easiness of association (the degree of ease of association) between a word included in the text data 10 and a word included in the text data 20 to the value corresponding to the easiness of association between the contexts including the respective words (the value indicating the degree of easiness of association between the contexts).

In the following description, the value indicating the degree of easiness of association between words is referred to as a word association degree, and the value of easiness of association between contexts is referred to as a context association degree. The easiness of association may be determined in consideration of a match between words, a word class, a blend (composite) word, or the like.

Specifically, the language processing apparatus 100 according to the present embodiment refers to the word vector database 110 to determine the word association degree between a word included in the text data 10 and a word included in the text data 20. Then, the language processing apparatus 100 determines the context association degree between a context including the word in the text data 10 and a context including the word in the text data 20 and updates the word association degree based on the context association degree.

The language processing apparatus 100 according to the present embodiment outputs, as the association result information 30, a result in which the word included in the text data 10 is associated with the word included in the text data 20 using the updated word association degree.

In this manner, according to the present embodiment, as words are associated with each other using the context association degree between the contexts including the words, the words may be appropriately associated with each other.

Although the word vector database 110 is provided in the language processing apparatus 100 in the example of FIG. 1, the present invention is not limited thereto. The word vector database 110 may be provided outside the language processing apparatus 100. The word vector database 110 may store, for example, word vectors of words in a field containing the content indicated by the text data 10 and the text data 20.

The text data 10 and the text data 20 according to the present embodiment may be any text data indicating a context (unit) including a plurality of words. Specifically, each of the text data 10 and the text data 20 may be, for example, a single sentence or a group of sentences.

Each of the text data 10 and the text data 20 may be, for example, a simple character string or may include no sentence. Specifically, the text data 10 and the text data 20 may be, for example, a character string extracted from specific document data.

In other words, the context association degree according to the present embodiment is the value indicating the degree of easiness of association with a word group included in the text data 10 or a word group included in the text data 20 (the value indicating the degree of easiness of association between word groups).

Figure 2:
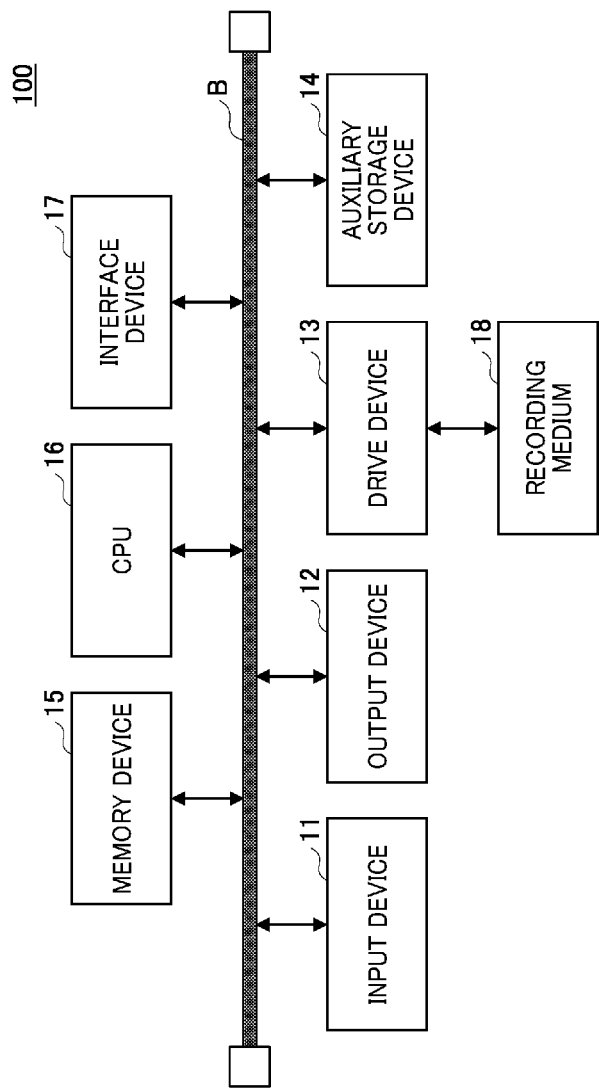
FIG. 2 is a diagram illustrating an example of a hardware configuration of the language processing apparatus of FIG. 1.

The language processing apparatus 100 according to the present embodiment is further described below. FIG. 2 is a diagram that illustrates an example of a hardware configuration of the language processing apparatus 100.

The language processing apparatus 100 according to the present embodiment is implemented by, for example, an information processing apparatus including an input device 11, an output device 12, a drive device 13, an auxiliary storage device 14, a memory device 15, a central processing unit (CPU) 16, and an interface device 17. These devices are coupled to one another via a bus B.

The input device 11 is a device for inputting various types of information and may be, for example, a keyboard, a pointing device, etc. The output device 12 is for outputting various types of information and may be, for example, a display, etc. The interface device 17 includes a LAN card, or the like, and is used to connect the language processing apparatus 100 to a network.

A language processing program is at least a part of various programs for controlling the language processing apparatus 100. The language processing program is provided, for example, by distributing a recording medium 18 or being downloaded via the network. Various types of storage media, e.g., a storage medium that records information optically, electrically, or magnetically, such as a CD-ROM, a flexible disk, or a magneto-optical disk, or a semiconductor memory that records information electrically, such as a ROM or a flash memory, may be used as the recording medium 18 having the language processing program recorded therein.

The language processing program is installed in the auxiliary storage device 14 from the recording medium 18 via the drive device 13 after the recording medium 18 having the language processing program stored therein is placed in the drive device 13. The language processing program downloaded via the network is installed in the auxiliary storage device 14 via the interface device 17.

The auxiliary storage device 14 stores the installed language processing program, various files, data, etc. The memory device 15 reads the language processing program from the auxiliary storage device 14 in response to the start-up of the language processing apparatus 100 and stores the language processing program therein. The CPU 16 performs various processes described later in accordance with the language processing program stored in the memory device 15.

Figure 3:
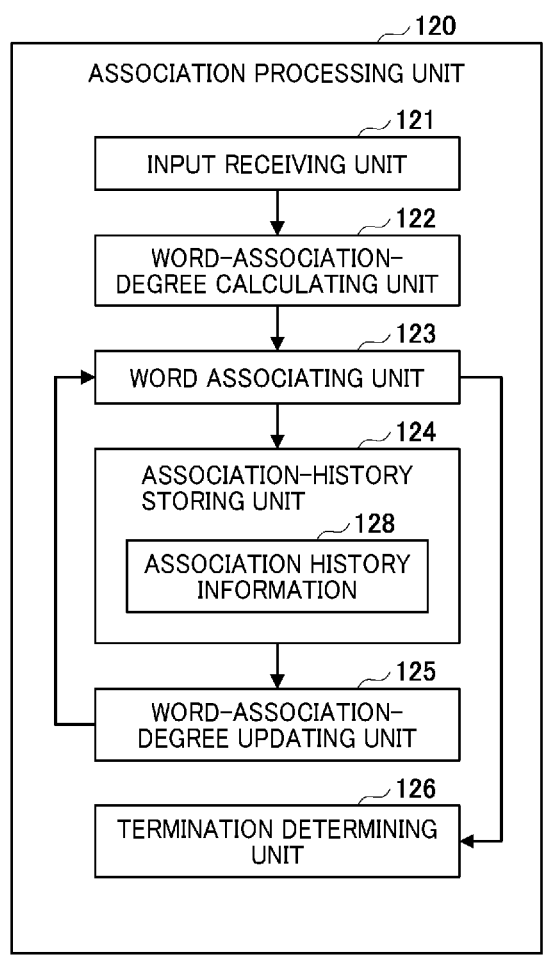
FIG. 3 is a diagram illustrating an example of a functional configuration of an association processing unit of the language processing apparatus of FIG. 1.

Next, referring to FIG. 3, a function of the association processing unit 120 of the language processing apparatus 100 according to the present embodiment is described. FIG. 3 is a diagram that illustrates a function of the association processing unit of the language processing apparatus of FIG. 1. Each of the units described below is implemented in response to reading and execution of the language processing program stored in the memory device 15 by the CPU 16.

The association processing unit 120 according to the present embodiment includes an input receiving unit 121, a word-association-degree calculating unit 122, a word associating unit 123, an association-history storing unit 124, a word-association-degree updating unit 125, and a termination determining unit 126.

The input receiving unit 121 receives, in the language processing apparatus 100, the inputs of the text data 10 (first text data) and the text data 20 (second text data) in which words are associated.

The word-association-degree calculating unit 122 refers to the word vector database 110 to calculate the word association degree for each combination of words with regard to the association between each word included in the text data 10 and each word included in the text data 20, both received by the input receiving unit 121. In the following description, information including the word association degree for each combination of words is referred to as word-association-degree information.

The word associating unit 123 associates a word included in the text data 10 and a word included in the text data 20 by using, for example, the Gale-Shapley algorithm based on the word-association-degree information calculated by the word-association-degree calculating unit 122. Then, the word associating unit 123 outputs association information as a result.

The association-history storing unit 124 stores information including the word-association-degree information calculated by the word-association-degree calculating unit 122 and the association information as association history information 128 indicating the word association history.

The word-association-degree updating unit 125 refers to the association history information 128 stored in the association-history storing unit 124 to calculate the context association degree between the text data 10 and the text data 20. Then, the word-association-degree updating unit 125 uses the context association degree and the association history information 128 to update the word association degree for each combination of words.

The termination determining unit 126 determines whether there is any change in the association history information 128 after the word-association-degree updating unit 125 performs a process. The termination determining unit 126 terminates the process of the association processing unit 120 in a case where there is no change.

Figure 4:
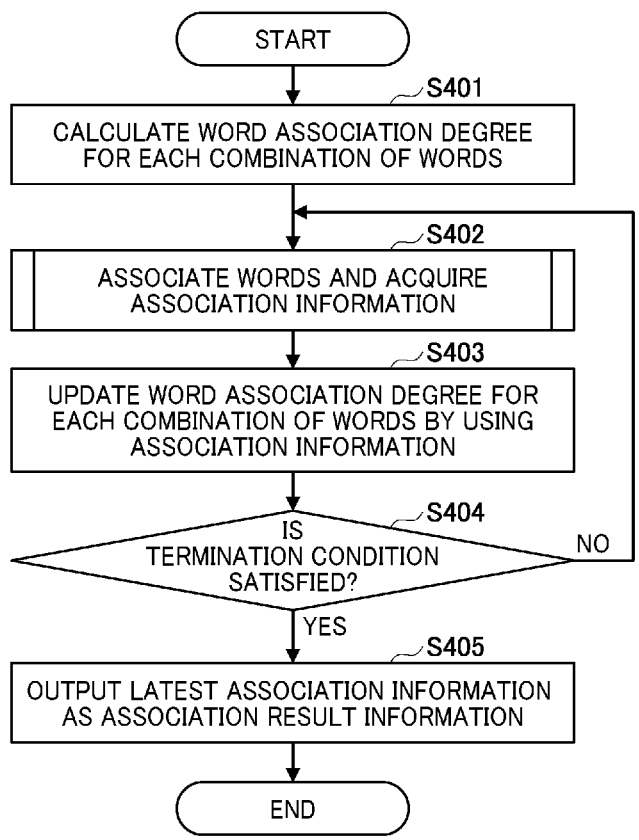
FIG. 4 is a flowchart illustrating an example operation of the language processing apparatus of FIG. 1.

Next, referring to FIG. 4, an operation of the language processing apparatus 100 according to the present embodiment is described. FIG. 4 is a flowchart that illustrates an operation of the language processing apparatus.

In the language processing apparatus 100 according to the present embodiment, the association processing unit 120 causes the word-association-degree calculating unit 122 to calculate the word association degree for each combination of words included in the respective sets of text data in response to the received inputs of the text data 10 and the text data 20 by the input receiving unit 121 (Step S401). The association-history storing unit 124 stores the word association degree for each combination of words as word-association-degree information and as part of the association history information 128.

The calculation of the word association degree by the word-association-degree calculating unit 122 is described below. In the following description, the i-th word of the x-th unit included in the text data 10 is represented as axi, and the j-th word of the y-th unit included in the text data 20 is represented as byj. The unit is, for example, a unit such as one sentence or one line. The unit may be optionally determined.

In the following description, the word association degree from the word axi to the word byj is represented as P(axi→byj). In other words, the value indicating the degree of easiness of association between the word axi and the word byj is represented as P(axi→byj). The easiness of association may be also represented as an expression such as a similar meaning or a close position arranged in a context.

The word-association-degree calculating unit 122 according to the present embodiment calculates the word association degree P according to the following Equation (1).

$$\text{Word association degree } P(axi \rightarrow byj) = \langle axi, byj \rangle \quad \text{Equation (1)}$$

Here, <axi,byj> represents the inner product of the word vector of the word axi and the word vector of the word byj in the word vector database 110.

The word vector may be any word vector that represents the appearance distribution of a word. The word vector is previously obtained simply for each word and stored in the word vector database 110. For example, the word vector may be an n-dimensional vector having 0 or 1 as an element indicating the presence or absence of the appearance of a word in each text tk of a text set (t1, t2, . . . , tn). The word vector may be a vector generated using any desired method, such as the method disclosed in a document ("Distributed Representations of Sentences and Documents" Proceedings of the 31st International Conference on Machine Learning (ICML 2014), 2014, pp. 1188-1196) using deep learning.

Words having a similar meaning also have a similar appearance distribution (usage situation). Therefore, the more similar the semantic content of words, the larger the inner product of word vectors determined in accordance with the appearance distribution. Thus, the word association degree P(axi→byj) between the words is also higher.

Consideration is given to two words, for example, "dog" and "school". The word "dog" often appears in pet-related books (texts), etc., and the word "school" often appears in education-related books (texts), etc. The word "cat" also often appears in pet-related books (texts), etc., as is the case with "dog". The word "college" also often appears in education-related books (texts), etc., as is the case with "school".

Here, consideration is given to a word vector (n1, n2, n3, n4) in which the numbers of appearance of words in pet-related books t1 and t2 and education-related books t3 and t4 are arranged. In the word vectors of "dog" and "cat", n1 and n2 are large, and n3 and n4 are small. Conversely, in the word vectors of "school" and "college", n1 and n2 are small, and n3 and n4 are large. Thus, the inner product of the word vectors of "dog" and "cat" is larger than the inner product of the word vector of "dog" and "college". That is, the word association degree of the combination of "dog" and "cat" is higher than the word association degree of the combination of "dog" and "college".

The word-association-degree calculating unit 122 according to the present embodiment calculates the word association degree P(axi→byj) with regard to all possible combinations of words included in the text data 10 and the words included in the text data 20. All possible combinations of words could be one or more combinations of words. In selecting all possible combinations of words, the word-association-degree calculating unit 122 may select, respectively from the text data 10 and the text data 20, a preset number "N" of words from the top of the text data, and uses a combination of the selected words. The present number N may be set to any desired number. In one example, the preset number N may be set to, for example, a smallest one of the maximum number of words selectable from the text data 10 and the maximum number of words selectable from the text data 20. In another example, the preset number N may be set so as not to increase the predetermined threshold (such as 100 words) to reduce the processing speed in case the number of combinations could be large. The preset number N may be one, such that one combination of words in the text data 10 and the text data 20 may be selected as all possible combinations. Such number may depend on other factors, such that it may be determined by the word-association-degree calculating unit 122, according to software program based on statistical data.

The word-association-degree calculating unit 122 causes the association-history storing unit 124 to hold the set of the word association degrees P(axi→byj) as word-association-degree information.

Then, the association processing unit 120 causes the word associating unit 123 to refer to the word-association-degree information so as to associate a word included in the text data 10 with a word included in the text data 20, thereby acquiring the association information (Step S402). The association information is held in the association-history storing unit 124 as part of the association history information 128. Details of the process at Step S402 are described later.

Then, the association processing unit 120 updates the word-association-degree information (Step S403). In other words, the word-association-degree updating unit 125 updates the word association degree for each combination of words.

A process of the word-association-degree updating unit 125 is described below. The word-association-degree updating unit 125 according to the present embodiment updates the word-association-degree information according to the following Equation (2).

$$P(axi \rightarrow byj) = P(axi \rightarrow byj | ux \rightarrow uy) \times P(ux \rightarrow uy) \qquad \text{Equation (2)}$$

Here, ux represents the x-th unit (context) included in the text data 10, and uy represents the y-th unit included in the text data 20. P(ux→uy) represents the context association degree indicating the easiness of association between the unit ux and the unit uy. The context association degree changes depending on the association information acquired by the word associating unit 123.

The first term on the right side of Equation (2) is obtained by the following Equation (3). Equation (3) represents the probability that the word axi is associated with the word byi in a case where the unit ux and the unit uy are associated with each other.

Values obtained from Equation (1) are used for P(axi→byj) and P(axi→byk) in Equation (3). Further, Σ_k, and the like, represent a sum with regard to k.

$$P(axi \rightarrow byj | ux \rightarrow uy) = P(axi \rightarrow byj) / \Sigma\_k P(axi \rightarrow byk) \qquad \text{Equation (3)}$$

The second term on the right side of Equation (2) is obtained by the following Equation (4). P(axi→byj) in Equation (4) is the word association degree between associated words in the association information obtained by the word associating unit 123.

$$P(ux \rightarrow uy) = \Sigma\_i P(axi \rightarrow byj) / \Sigma\_i \Sigma\_z P(axi \rightarrow bzl) \qquad \text{Equation (4)}$$

In this manner, the word-association-degree information according to the present embodiment is updated by Equation (2) represented by the product of Equation (3) and Equation (4).

Here, although the conditional probability of Equation (3) is a value obtained by Equation (1) and does not change, the context association degree obtained by Equation (4) changes depending on a result of the word associating unit 123.

When the word-association-degree information updated by Equation (2) changes in accordance with a change in the context association degree obtained by Equation (4), there is a possibility that a result of the process of the word associating unit 123 at Step S402 of FIG. 4 also changes.

Then, the association processing unit 120 causes the termination determining unit 126 to determine whether the termination condition for the process is satisfied (Step S404).

Specifically, the termination determining unit 126 determines that the termination condition is satisfied in a case where the word-association-degree information calculated and updated at Step S403 matches the word-association-degree information before the update. That is, the termination determining unit 126 determines that the termination condition for the process is satisfied in a case where the associative relation between a word in the text data 10 and a word in the text data 20 does not change.

Specifics of a process of the termination determining unit 126 are described below. The termination determining unit 126 according to the present embodiment calculates and stores a log-likelihood Q defined by Equation (5). In a case where the value of the log-likelihood Q is smaller than or equal to the previous value stored, the termination determining unit 126 determines that the termination condition is satisfied.

$$Q = \Sigma\_x \Sigma\_y \log P(ux \rightarrow uy) \qquad \text{Equation (5)}$$

When it is determined that the termination condition is not satisfied at Step S404 (No at Step S404), the association processing unit 120 returns to Step S402.

When it is determined that the termination condition is satisfied at Step S404 (Yes at Step 404), the association processing unit 120 causes the output unit 130 to output the latest association information as the association result information 30 (Step S405) and terminates the process. In other words, the output unit 130 outputs the word byj, in the text data 20, associated with each of the words axi included in the text data 10.

Figure 5:
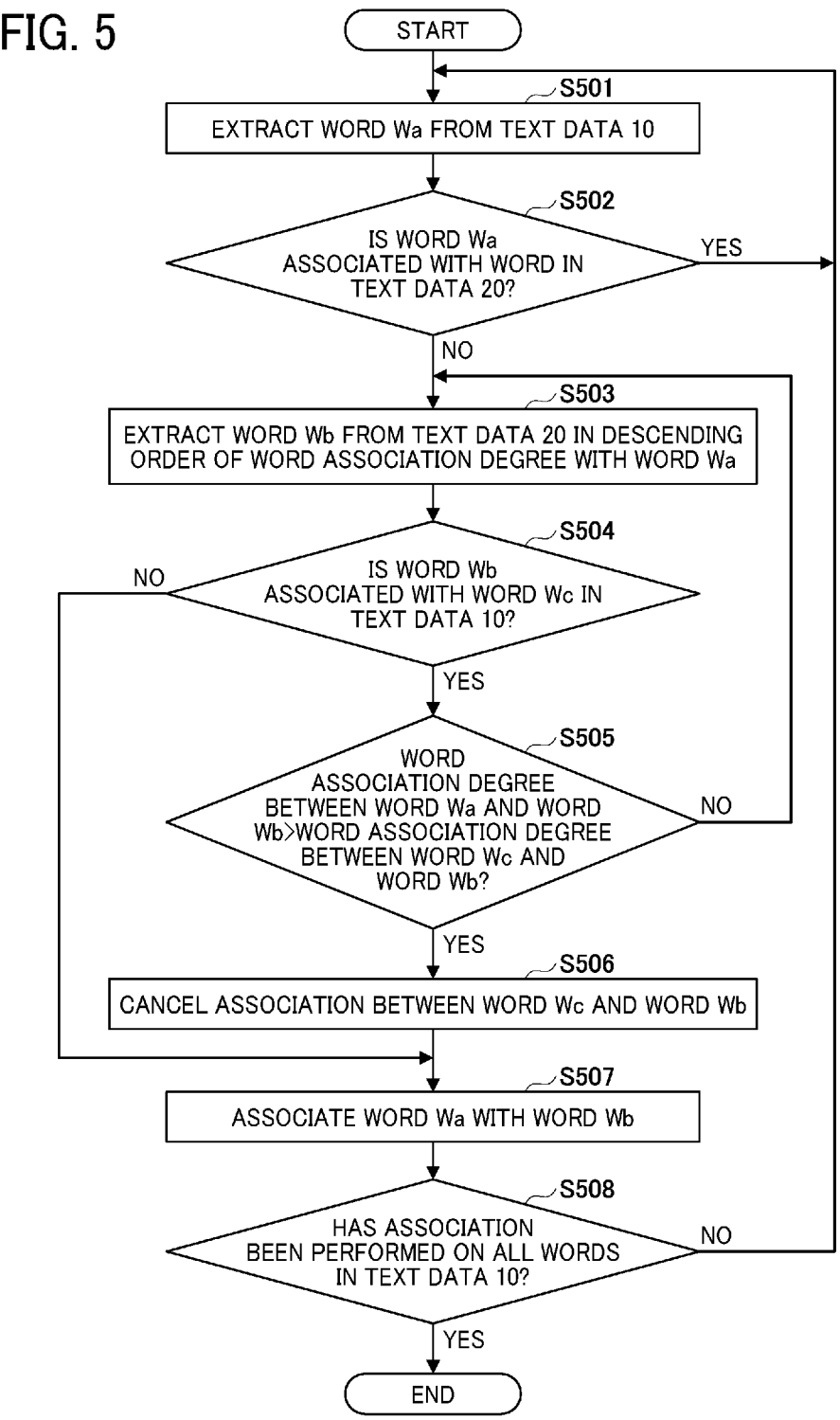
FIG. 5 is a flowchart illustrating an example operation of the language processing apparatus of FIG. 1.

Next, referring to FIG. 5, a process of the word associating unit 123 is described. FIG. 5 is a flowchart that illustrates an operation of the language processing apparatus of FIG. 1. FIG. 5 describes the details of the process at Step S402 of FIG. 4.

The word associating unit 123 according to the present embodiment extracts a word Wa from the text data 10 (Step S501). Then, the word associating unit 123 determines whether the word Wa is associated with a word included in the text data 20 (Step S502). In a case where it is determined that the word Wa is associated with a word included in the text data 20 at Step S502 (Yes at Step S502), the process returns to Step S501.

In a case where it is determined that the word Wa is not associated with a word included in the text data 20 at Step S502 (No at Step S502), the word associating unit 123 extracts a word Wb from the text data 20 in the descending order of the word association degree with the word Wa (Step S503).

Then, the word associating unit 123 determines whether the word Wb is associated with a word Wc that is included in the text data 10 and is different from the word Wa (Step S504). In a case where it is determined that the word Wb is not associated with the word Wc at Step S504 (No at Step S504), the process proceeds to Step S507 described later.

In a case where it is determined that the word Wb is associated with the word Wc at Step S504 (Yes at Step 504), the word associating unit 123 determines whether the word association degree between the word Wa and the word Wb is higher than the word association degree between the word Wc and the word Wb (Step S505). In a case where it is determined that the word association degree between the word Wa and the word Wb is lower than or equal to the word association degree between the word Wc and the word Wb at Step S505 (No at Step S505), the word associating unit 123 returns to Step S503.

In a case where it is determined that the word association degree between the word Wa and the word Wb is higher than the word association degree between the word Wc and the word Wb at Step S505 (Yes at Step S505), the word associating unit 123 cancels the association between the word Wc and the word Wb (Step S506). Then, the word associating unit 123 associates the word Wa with the word Wb (Step S507).

Then, the word associating unit 123 determines whether the association has been performed on all the words included in the text data 10 (Step S508). In a case where it is determined that the association has not been performed on all the words at Step S508 (No at Step S508), the word associating unit 123 returns to Step S501. In a case where it is determined that the association has been performed on all the words at Step S508 (Yes at Step S508), the word associating unit 123 terminates the process.

According to the present embodiment, in a case where the number of words included in the text data 20 is smaller than the number of words included in the text data 10, a dummy word may be added to the text data 20 so that the number of words in the text data 20 is equal to the number of words in the text data 10. The word association degree between the dummy word to be added and a word included in the text data 10 is lower than the word association degree between the dummy word and a word included in the text data 20.

For example, when the text data 10 includes words w1, w2, and w3 and the text data 20 includes words w5 and w6, a dummy word w7 is added to the text data 20 so that the number of words in the text data 20 is identical to the number of words in the text data 10.

The word w7 may have any word form or identification label so as to be distinguished from the other words w5 and w6 in the text data 20 and be identified as w7. The word association degree between the word w1 and the word w7 is, for example, a value (e.g., 0.0) smaller than 0.1 when the word association degree between the word w1 and the word w5 is 0.1 and the word association degree between the word w1 and the word w6 is 0.3.

The word association degree between the word w2 and the word w7 is a value (e.g., 0.0) smaller than 0.2 when the word association degree between the word w2 and the word w5 is 0.2 and the word association degree between the word w2 and the word w6 is 0.4.

In a case where the word association degree is defined to be non-negative, the word association degree with a dummy word may be uniformly set to zero.

Next, referring to FIGS. 6 to 11, the specifics of a process of the association processing unit 120 according to the present embodiment are described.

Figure 6:
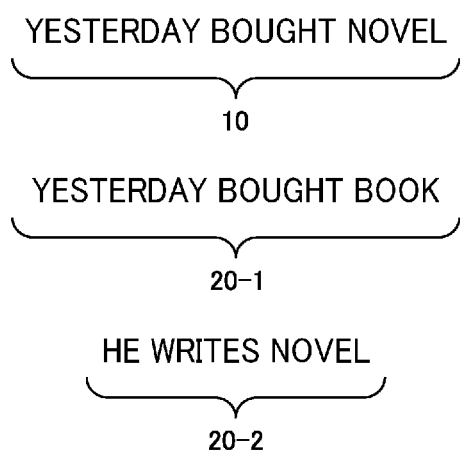
FIG. 6 is a diagram illustrating an example of text data.

FIG. 6 is a diagram that illustrates an example of the text data. In FIG. 6, the text data 10 includes one unit "yesterday bought novel". In the following description, the unit "yesterday bought novel" included in the text data 10 is described as a unit ua1.

The text data 20 includes two units "yesterday bought book" and "he writes novel". In the following description, a first unit "yesterday bought book" included in the text data 20 is described as a unit ub1, and a second unit "he writes novel" is described as a unit ub2.

FIG. 7 is a table that illustrates an example of the word-association-degree information. FIG. 7 illustrates word-association-degree information 71 that is a calculation result of the word association degree for each combination of a word included in the text data 10 and a word included in the text data 20, illustrated in FIG. 6.

In the example of FIG. 7, the words included in the text data 10 are described in the vertical axis direction, and the words included in the text data 20 are described in the horizontal axis direction.

The words included in the text data 10 are three, i.e., "yesterday", "novel", and "bought". The words included in the text data 20 are six, i.e., "yesterday", "book", "bought", "he", "novel", "writes". In this particular example, the words are arranged as "yesterday novel bought", when written in Japanese. The words are arranged as "yesterday novel bought" and "he novel writes", when written in Japanese. For this reasons, arrangement of the words in FIG. 7 differs from that of the words in FIG. 6.

Here, the word associating unit 123 refers to the word vector database 110 and uses the word vectors of the words included in the text data 10, the word vectors of the words included in the text data 20, and Equation (1) to calculate the word association degree between the words. The word association degree between the words illustrated in FIG. 7 is the word association degree before being updated by the word-association-degree updating unit 125 and can be said to be the default value of the word association degree.

In FIG. 7, in order to simplify the description, most of the word association degrees are uniformly set to 0.0. The association processing unit 120 causes the word associating unit 123 to associate words with each other after the word-association-degree information 71 is acquired.

FIG. 8 is a table that illustrates an example of the association information. The association information 81 illustrated in FIG. 8 represents a result of the association between a word included in the text data 10 and a word included in the text data 20 using the Gale-Shapley algorithm based on the word-association-degree information 71 of FIG. 7.

Then, the association processing unit 120 causes the word-association-degree updating unit 125 to calculate the context association degree for each combination of a unit included in the text data 10 and a unit included in the text data 20.

FIG. 9 is an example table that illustrates the update to the word-association-degree information. FIG. 9 illustrates a result obtained by Equation (3).

For example, in a case where the unit ua1 is associated with the unit ub1, the word association degree between the word "yesterday" in the unit ua1 and the word "yesterday" in the unit ub1 is as follows:

$$P(\text{yesterday} \to \text{yesterday} | ua1 \to ub1) = P(\text{yesterday} \to \text{yesterday}) / \{P(\text{yesterday} \to \text{yesterday}) + P(\text{yesterday} \to \text{book}) + P(\text{yesterday} \to \text{bought})\} = 1.0/(1.0+0+0) = 1.0$$

In a case where the unit ua1 is associated with the unit ub2, the word association degree between the word "yesterday" in the unit ua1 and the word "he" in the unit ub2 is as follows:

$$P(\text{yesterday} \to \text{he} | ua1 \to ub2) = P(\text{yesterday} \to \text{he}) / \{P(\text{yesterday} \to \text{he}) + P(\text{yesterday} \to \text{novel}) + P(\text{yesterday} \to \text{write})\} = 0.31(0.3+0+0) = 1.0$$

Figure 10:
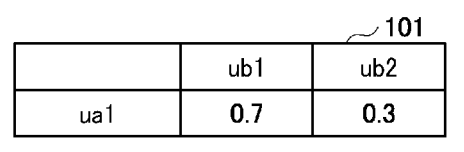

FIG. 10 is an example table that illustrates the update to the word-association-degree information. FIG. 10 illustrates a result obtained by Equation (4). In FIG. 10, the unit included in the text data 10 is described in the vertical axis direction, and the unit included in the text data 20 is described in the horizontal axis direction.

In the association information 81 illustrated in FIG. 8, the word "yesterday" in the unit ua1 is associated with the word "yesterday" in the unit ub1, and the word "novel" in the unit ua1 is associated with the word "novel" in the unit ub2. The word "bought" in the unit ua1 is associated with the word "bought" in the unit ub1.

In FIG. 10, the context association degree between the unit ua1 and the unit ub1 is as follows:

$$P(ua1 \to ub1) = \{P(\text{yesterday} \to \text{yesterday}) + P(\text{bought} \to \text{bought})\} / \{P(\text{yesterday} \to \text{yesterday}) + P(\text{novel} \to \text{novel}) + P(\text{bought} \to \text{bought})\} = (1.0+1.0)/(1.0+1.0+1.0) = 2.0/3.0 = 0.7 \text{ (rounding off } 0.66 \ldots)$$

Similarly, the context association degree between the unit ua1 and the unit ub2 is as follows:

$$P(ua1 \to ub2) = P((\text{novel} \to \text{novel}) / \{P(\text{yesterday} \to \text{yesterday}) + P(\text{novel} \to \text{novel}) + P(\text{bought} \to \text{bought})\} = 1.0/(1.0+1.0+1.0) = 1.0/3.0 = 0.3 \text{ (rounding off } 0.33)$$

FIG. 11 illustrates the calculation result of the value of Equation (2) using the values in the above Equation (3) and Equation (4). FIG. 11 is a table that illustrates an example of the updated word-association-degree information.

The word association degree for each combination of words illustrated in FIG. 11 is the word association degree updated according to Equation (2). That is, FIG. 11 illustrates word-association-degree information 71A that is obtained by updating the word-association-degree information 71 illustrated in FIG. 7 by using Equation (2).

According to the present embodiment, the word "novel" included in the unit ua1 is associated with not the word "novel" included in the unit ub1 but the word "book" included in the unit ub2 as a result of the association between the words by the word associating unit 123 based on the updated word-association-degree information 71A.

That is, the present embodiment makes it possible to use the word association degree that is based on the context association degree between the units to which words belong as obtained by Equation (4), as well as the word association degree between the words themselves as obtained by Equation (1).

According to the present embodiment, the word "novel" appearing in the context "yesterday bought novel" may be associated with "book" that appears in the context "yesterday bought book", which is similar as compared with the context "he writes novel", and that has a high word association degree with the word "novel". Thus, according to the present embodiment, words may be appropriately associated with each other.

Although the word association degree is calculated by using the word vector stored in the word vector database 110 according to the present embodiment, there is no limitation on the value serving as the word association degree. The word association degree may be any word association degree indicating the degree (index) of easiness of association between words. The word association degree may indicate, for example, the degree of similarity in the shape of a character included in a word, the appearance position in a context, the number of characters, or the type of character.

Figure 12:
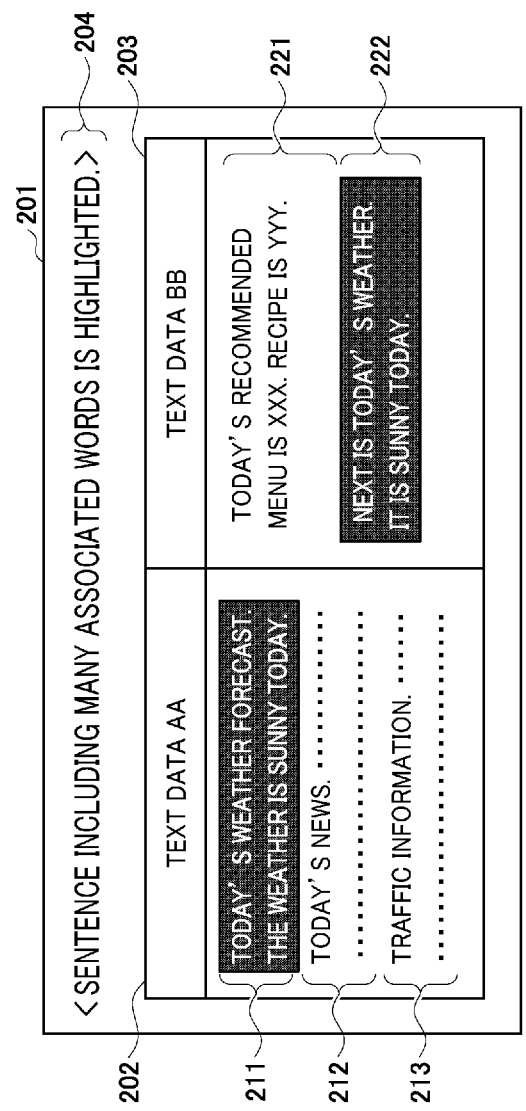
FIG. 12 is a diagram illustrating a display example using association result information.

Next, referring to FIG. 12, a display example of a result of the word association using the association result information 30 according to the present embodiment is described. FIG. 12 is a diagram that illustrates a display example using the association result information.

A screen 201 illustrated in FIG. 12 may be, for example, a screen displayed on the output device 12, or the like, of the language processing apparatus 100, or a screen displayed on a terminal device, or the like, which communicates with the language processing apparatus 100.

The screen 201 presents display fields 202 and 203 for displaying two sets of input text data, respectively, and a message 204 indicating that sentences including the associated words are highlighted in the respective sets of text data.

The display field 202 displays text data AA. The text data AA includes units 211, 212, and 213. The display field 203 displays text data BB. The text data BB includes units 221 and 222.

In the example of FIG. 12, the unit 211 of the text data AA and the unit 222 of the text data BB are highlighted. That is, it is understood that, in the example of FIG. 12, a word included in the unit 211 of the text data AA and a word included in the unit 222 of the text data BB are associated with each other.

Thus, the screen 201 allows the viewer of the screen 201 to view that, in the text data AA and the text data BB, the unit 211 and the unit 222 are contexts having a similar meaning.

Although highlighting is applied on a per-unit basis in the example of FIG. 12, the present invention is not limited thereto. According to the present embodiment, two associated words may be displayed with markers in the same color in the association result information 30. A word included in the highlighted unit may be displayed with a marker in a color different from the color of the marker attached to the unit.

In the example of FIG. 12, when, for instance, the word "weather" in the unit 211 and the "weather" in the unit 222 are associated with each other in the association result information 30, these two words may be highlighted with a display form (including character style, font, etc.) different from the markers attached to the units 211 and 222.

Figure 13:
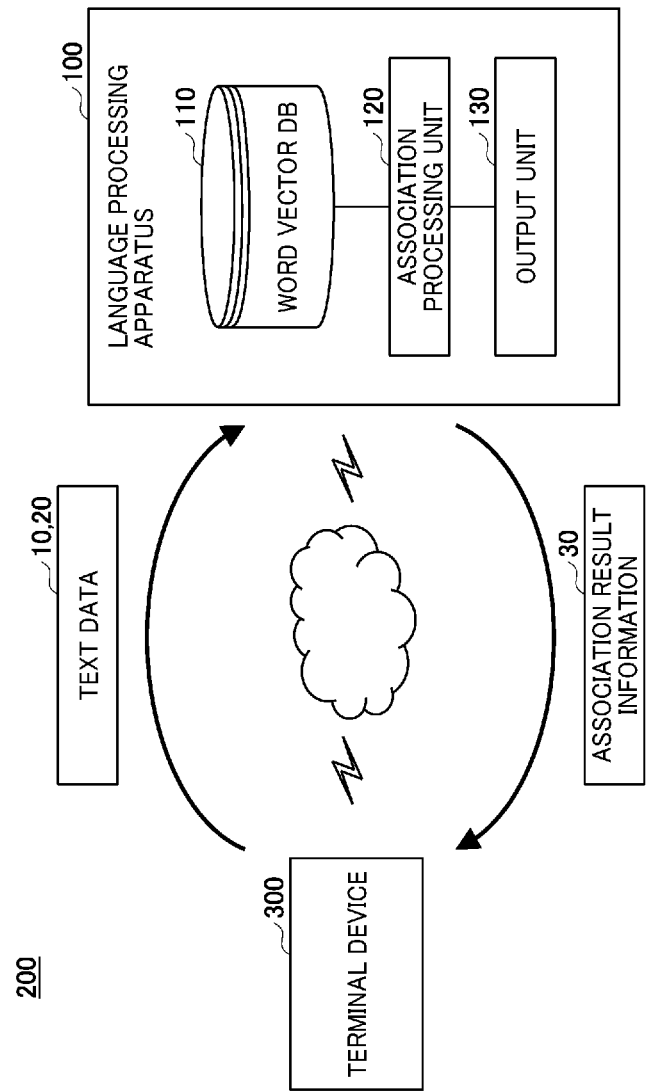
FIG. 13 is a diagram illustrating an example configuration of a system including the language processing apparatus of FIG. 1.

Next, a system configuration of a language processing system having the language processing apparatus 100 according to the present embodiment is described. FIG. 13 is a diagram that illustrates an example of a system configuration of a system including the language processing apparatus of FIG. 1.

The language processing system 200 illustrated in FIG. 13 includes the language processing apparatus 100 and a terminal device 300. The terminal device 300 is connected to the language processing apparatus 100 via a network, or the like.

In the language processing system 200, the language processing apparatus 100 executes a process of the association processing unit 120 based on the text data 10 and the text data 20 in response to the reception of the text data 10 and the text data 20 from, for example, the terminal device 300. The output unit 130 outputs the association result information 30 acquired as a result of the process of the association processing unit 120 to the terminal device 300.

The text data 10 and the text data 20 received from the terminal device 300 may be received in advance as two text files or may be received as one text file.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to Japanese Patent Application No. 2018-186005, filed on Sep. 28, 2018, in the Japan Patent Office, the entire disclosure of which is hereby incorporated by reference herein.

REFERENCE SIGNS LIST 10, 20 text data
100 language processing apparatus
110 word vector database
120 association processing unit
121 input receiving unit
122 word-association-degree calculating unit
123 word associating unit
124 association-history storing unit
125 word-association-degree updating unit
126 termination determining unit
128 association history information
130 output unit

The invention claimed is:

1. A computer-implemented method of processing language, the method comprising:
calculating values indicating a degree of easiness of association between words with regard to one or more combinations of words in a first word group included in first text data and a second word group included in second text data, the first word group including at least three words, and the second word group including at least three words;
associating words of the first word group with words of the second word group based on the values indicating the degree of easiness of association;
calculating values indicating a degree of easiness of association between each word of the first word group and each word of the second word group using a result of the associating and the values indicating the degree of easiness of association between the words; and
updating the values indicating the degree of easiness of association between each word of the first group and each word of the second group using the values indicating the degree of easiness of association between each word of the first group and each word of the second word group to indicate an association degree of the first word group and the second word group.

2. The computer-implemented method according to claim 1, further comprising:
outputting the result of the associating when the result of the associating satisfies a termination condition.

3. The computer-implemented method according to claim 2, wherein the termination condition is a condition in which a result of an association between a first word and a second word based on the updated values indicating the degree of easiness of association between the words matches a result before update.

4. The computer-implemented method according to claim 1, wherein the word groups include any of text data indicating a context including a plurality of words, one sentence, and a group of sentences.

5. A non-transitory computer-readable recording medium storing a computer readable code for controlling a computer system to perform a method comprising:
calculating values indicating a degree of easiness of association between words with regard to one or more combinations of words in a first word group included in first text data and a second word group included in second text data, the first word group including at least three words, and the second word group including at least three words;
associating words of the first word group with words of the second word group based on the values indicating the degree of easiness of association;

calculating values indicating a degree of easiness of association between each word of the first word group to each word of the second word group using a result of the associating and the values indicating the degree of easiness of association between the words; and updating the values indicating the degree of easiness of association between each word of the first group and each word of the second group using the values indicating the degree of easiness of association between each word of the first group and each word of the second word group to indicate an association degree of the first word group and the second word group.

6. The non-transitory computer-readable recording medium of claim 5, wherein the method further comprises:

outputting the result of the associating when the result of the associating satisfies a termination condition.

7. The non-transitory computer-readable recording medium of claim 6, wherein the termination condition is a condition in which a result of an association between the first word and the second word based on the updated value indicating the degree of easiness of association between the words matches a result before update.

8. The non-transitory computer-readable recording medium of claim 5, wherein the word groups include any of text data indicating a context including a plurality of words, one sentence, and a group of sentences.

9. A language processing apparatus, comprising:

processing circuitry configured to calculate values indicating a degree of easiness of association between words with regard to one or more combinations of words in a first word group included in first text data and a second word group included in second text data, the first word group including at least three words, and the second word group including at least three words;

associate words of the first word group with words of the second word group based on the values indicating the degree of easiness of association; and calculate values indicating a degree of easiness of association between each word of the first word group to each word of the second word group using a result of the associating and the values indicating the degree of easiness of association between the words, and update the values indicating the degree of easiness of association between each word of the first group and each word of the second group using the values indicating the degree of easiness of association between each word of the first group and each word of the second word group to indicate an association degree of the first word group and the second word group.

\* \* \* \* \*